United States Patent [19]

Umetsu

[11] Patent Number: 5,832,366
[45] Date of Patent: Nov. 3, 1998

[54] RADIO SELECTIVE CALL RECEIVER

[75] Inventor: Shinjiro Umetsu, Tokyo, Japan

[73] Assignee: NEC Corporation, Tokyo, Japan

[21] Appl. No.: 662,368

[22] Filed: Jun. 12, 1996

[30] Foreign Application Priority Data

Jun. 13, 1995 [JP] Japan .................................. 7-145778

[51] Int. Cl.$^6$ .............................. H04B 1/16; H04B 7/00
[52] U.S. Cl. ........................ 455/38.3; 455/127; 455/343
[58] Field of Search ................................ 455/38.2, 38.3, 455/38.4, 343, 127, 522, 298; 340/825.44

[56] References Cited

U.S. PATENT DOCUMENTS 5,212,811  5/1993  Kuge et al. ............................. 455/127
5,361,397  11/1994 Wright .................................... 455/38.2
5,594,951  1/1997  Bellin ...................................... 455/343
5,649,315  7/1997  Eaton ...................................... 455/343

FOREIGN PATENT DOCUMENTS 4-83431   3/1992  Japan .

Primary Examiner—Reinhard J. Eisenzopf
Assistant Examiner—Sam Bhattacharya
Attorney, Agent, or Firm—Sughrue, Mion, Zinn, Macpeak & Seas, PLLC

[57] ABSTRACT

A controller stops the power supply to receiver circuits after the end of a call informing operation. The call informing unit can always be made call informing when the own call number is received. The message signal decoding can always be made. A call informing executing unit causes execution of a call informing operation in response to a power supply start instruction when the memory is storing a decoded message signal which has not yet been displayed. The presence of a decoded message signal remaining without being displayed, thus can be informed to the user.

11 Claims, 8 Drawing Sheets

RADIO SELECTIVE CALL RECEIVER

BACKGROUND OF THE INVENTION

The present invention relates to a radio selective call receiver and, more particularly, to a radio selective call receiver having a function of controlling the power supply to their internal circuits.

A conventional radio selective call receiver (hereinafter referred to as receiver) compares a call number contained in a received signal and its own predetermined call number and, when it detects that the two compared call numbers are identical, it receives a message signal succeeding the call number. When the receiver has fully received the message signal, it informs the reception of the call number to the user, for instance by generating a sound from a loudspeaker.

However, the receiver informs the reception of its own call number to the user after fully receiving the message signal. This gives rise to an inconvenience when the user turns off the power switch during the message signal reception. In such a case, the power supply to receiver circuits may be discontinued to make a radio unit of the receiver inoperative, so that the receiver can no longer fully receive the message signal.

To solve this problem, Japanese Laid-Open Patent Publication No. Heisei 4-83431, laid open on Mar. 17, 1992, proposes a selective call receiver, in which the power supply to the radio unit is not discontinued but is discontinued after reception of full message in the event of turning-off of the power switch during the message reception.

However, although in this selective call receiver the power supply to the radio unit is discontinued after the full message reception, when the power switch is turned off during the message reception, the power supply to the receiver circuits excluding the radio unit is discontinued to make an alarm inoperative at this moment. A problem is thus posed that the alarm is disabled to inform the reception of the call number to the user.

Another problem is that although the selective call receiver can receive the full message because the power supply to the radio unit is discontinued only after the full message reception, since the power supply to the receiver circuits excluding the radio unit is discontinued, a controller is made inoperative, thus disabling the decoding of the message.

SUMMARY OF THE INVENTION

An object of the present invention is therefore to provide a radio selective call receiver, which can solve the above problems, and in which the power supply to its circuits is discontinued, after the end of call informing, in response to the delivery of a power supply stop instruction from a power switch subsequent to the detection of call number identity.

Another object of the present invention is to provide a radio selective call receiver, in which the power supply to its circuits is stopped, at the end of message signal decoding, in response to a power supply stop instruction from the power switch subsequent to call number identity detection, and non-confirmed message, if any, is informed in response to a power supply re-start instruction from the power switch.

With the radio selective call receiver according to the present invention, the control means stops the power supply to the receiver circuits after the end of the call informing. The call informing means can always perform call informing when the receiver call number is received. Besides, according to the present invention the message signal decoding can always be performed.

Furthermore, with the radio selective call receiver according to the present invention, the call informing executing means causes execution of call informing by the call informing means in response to a power supply start instruction from the switch means when the memory means is holding a decoded message signal which has not yet been displayed. The presence of a decoded message signal remaining without being displayed, thus can be informed to the user.

Other objects and features will be clarified from the following description with reference to attached drawings.

PREFERRED EMBODIMENTS OF THE INVENTION

Figure 1:
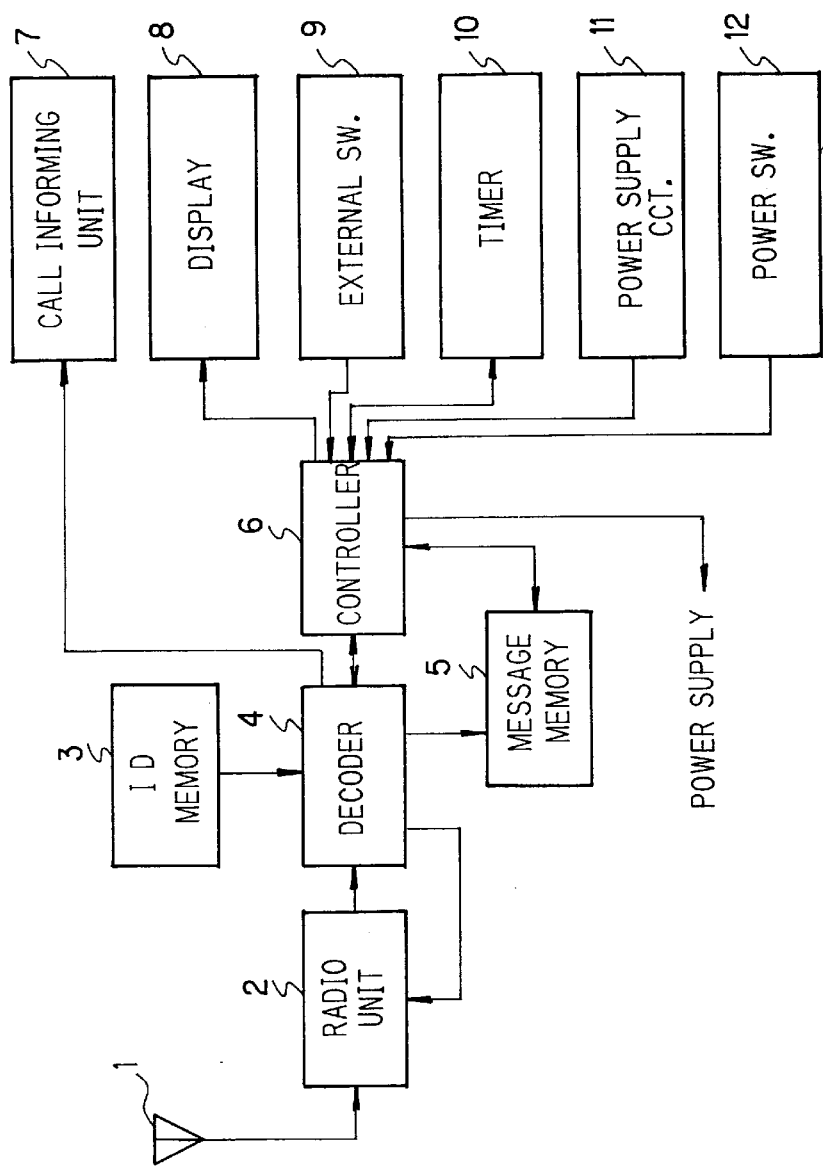
FIG. 1 shows, in a block diagram, a radio selective call receiver embodying the present invention.

FIG. 1 shows, in a block diagram, a radio selective call receiver (hereinafter referred to as receiver) embodying the present invention. Referring to the Figure, an antenna 1 receives a radio signal from a base station (not shown), and outputs the received signal to a radio unit 2. The radio unit 2 amplifies, demodulates, and outputs a digital signal thus formed to a decoder 4. The radio unit 2 is on-off controlled according to a battery saving signal from the decoder 4. A call (ID) number memory (hereinafter referred to as ID memory) 3 holds a predetermined own call number.

After power is "on", the decoder 4 establishes bit synchronization and frame synchronization of the receiver with respect to the received signal by detecting synchronizing signal in the digital signal inputted from the radio unit 2, and on the basis of this synchronization establishment it outputs a battery saving signal to the radio unit 2. The decoder 4 further compares a call number contained in the digital signal from the radio unit 2 and its own call number held in the ID memory 3, and upon detection of the identity of the call numbers it outputs a call number identity signal to a controller 6. After this call number identity detection, the decoder 4 decodes a message signal succeeding the call number, and outputs the decoded message signal to a message memory 5. After the outputting of the decoded message signal, the decoder 4 outputs a decoding end signal to the controller 6. The decoder 4 outputs a call informing drive signal to a call informing unit 7 in response to a call informing command signal from the controller 6. The message memory 5 memorizes the decoded message signal from the decoder 4. Or it outputs memorized message in response to a command from the controller 6.

When the controller 6 receives a call number identity signal from the decoder 4 while power is "on", it causes power supply from a power supply circuit 11 to individual circuits irrespective of subsequent turning-off of a power switch 12. In response to a message decoding end signal from the decoder 4, the controller 6 causes the decoded message signal to be read out from the message memory 5 for displaying on a display 8, while also outputting a call informing command signal to the decoder 4 and starting a timer 10. In the "on" state of the power switch 12 at the moment discontinuing the displaying on the display 8 and the outputting of the call informing command signal, the controller 6 continues the power supply to the individual receiver circuits. In the "off" state of the power switch 12 at this moment, the power supply to the individual receiver circuits is stopped. The controller 6 is best constructed with a microprocessor "μPD75308BGC" manufactured by NEC Corp.

The call informing unit 7 executes call informing in response to the call informing command signal from the decoder 4. The call informing unit 7 includes a loudspeaker, an LED, a vibrator, etc. (these components being not shown). An external switch 9 is operable by the user and, when it is depressed during call informing by the call informing unit 7, it outputs a power supply stop signal to the controller 6. The timer 10 starts the time measurement when the call informing unit 7 starts call informing, and upon its time-up after t the lapse of a predetermined period of time it outputs a time-up signal to the controller 6. The power supply circuit 11 generates power supplied to the controller 6. The power switch 12 is on-off operable by the user to instruct to the controller 6 the start and stop of the power supply from the power supply circuit 11 to the receiver circuits.

Figure 2:
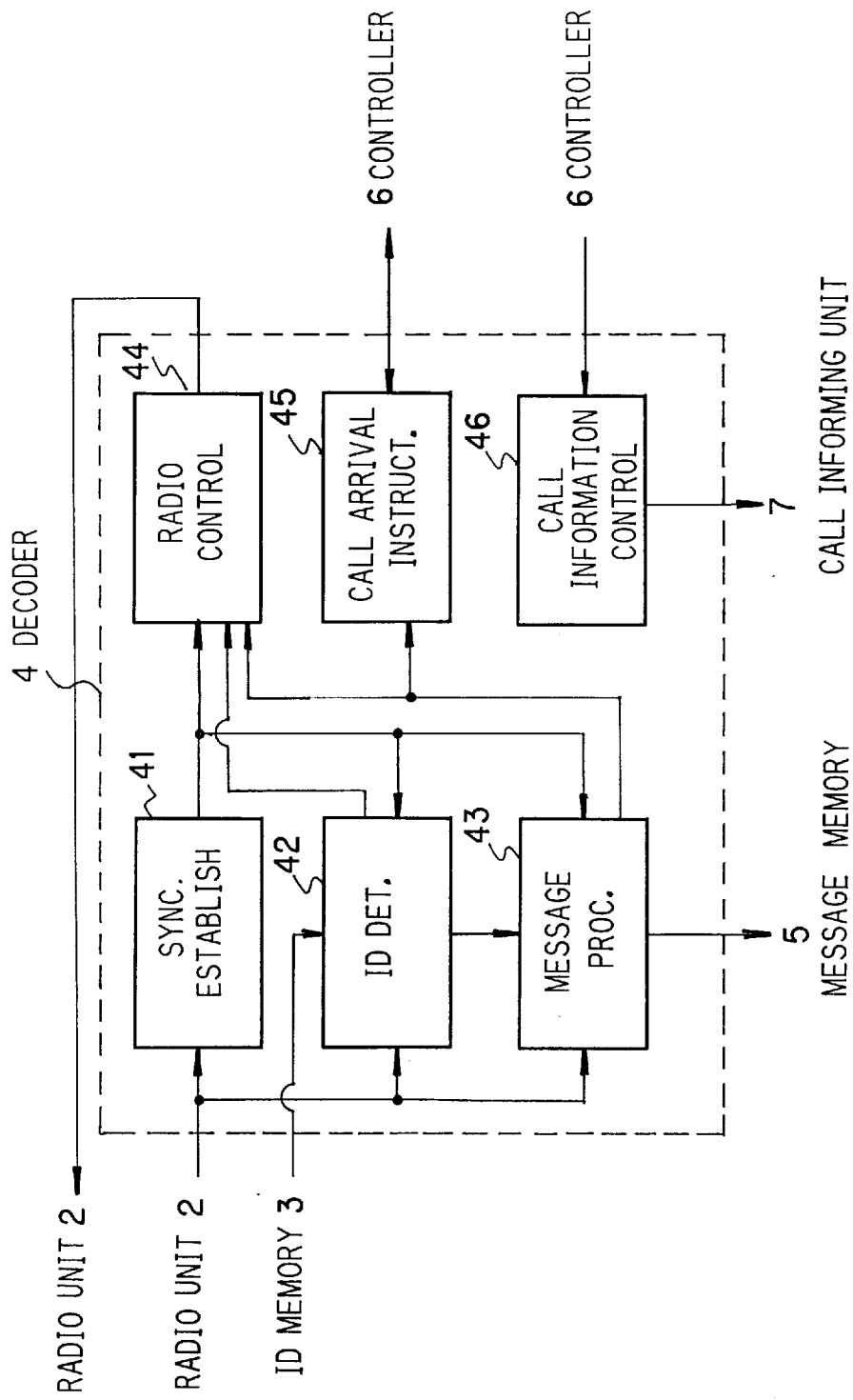
FIG. 2 shows a block diagram of the decoder in FIG. 1.

The operation of the decoder 4 shown in FIG. 1 will now be described in detail with reference to FIG. 2. Referring to the Figure, the decoder 4 includes a synchronization establishing unit 41, an ID detecting unit 42, and a message processing unit 43. The decoder 4 further includes a radio control unit 44, a call arrival instructing unit 45, and a call informing control unit 46.

The synchronization establishing unit 41 establishes the bit synchronization and frame synchronization of the receiver with respect to transmission signal on the basis of a preamble signal and a frame synchronization signal contained in the digital signal from the radio unit 2, and outputs a synchronization establishment signal thus generated to the ID detecting unit 42 and a message processing unit 44.

The ID detecting unit 42 receives the digital signal from the radio unit 2 in a timing of receiving the call number contained in frame 1 pertaining to the receiver in response to the synchronization establishment signal from the synchronization establishing unit 41.

The ID detecting unit 42 also compares the call number contained in the digital signal and the own call number memorized in the ID memory 3. When it detects the identity of the two call numbers, it outputs an identity signal to the radio control unit 44 and the call arrival instructing unit 45.

The message processing unit 43 receives the digital signal from the radio unit 2 in a timing of receiving a message signal succeeding the call number in response to an identity signal from the ID detecting unit 42. The unit 43 decodes the message signal from the radio unit 2, and outputs the decoded message signal to the message memory 5. After it has decoded the message signal, the unit 43 outputs a message recording end signal to the call arrival instructing unit 45.

The radio control unit 44 outputs a battery saving signal to the radio unit 2 and thus turns on the radio unit 2 in response to the start of power supply from the controller 6. The unit 44 also outputs the battery saving signal to the radio unit 2 and thus turns off the radio unit in response to a synchronization establishment signal from the synchronization establishing unit 41. The radio control unit 44 outputs the battery saving signal to the radio unit 2 thus turns on the radio unit 2 in a timing of receiving frame 1 pertaining to the own receiver. When the radio control unit 44 has not received the identity signal from the ID detecting unit 42 after the lapse of a predetermined period of time from the turning-on of the radio unit 2, it outputs the battery saving signal to the radio unit 2 and thus turns off the radio unit 2. When it receives the identity signal from the ID detecting unit 42, the unit 44 continually holds the radio unit 2 "on".

The call arrival instructing unit 45 outputs the message decoding end signal from the message processing unit 43 to the control unit 6. When it receives the call informing end signal from the controller 6, the call arrival instructing unit 45 outputs a power supply stop inhibiting mode releasing signal to the controller 6. The call informing control unit 46 outputs a call informing drive signal to the call informing unit 7 in response to a call informing command signal from the controller 6.

Figure 3:
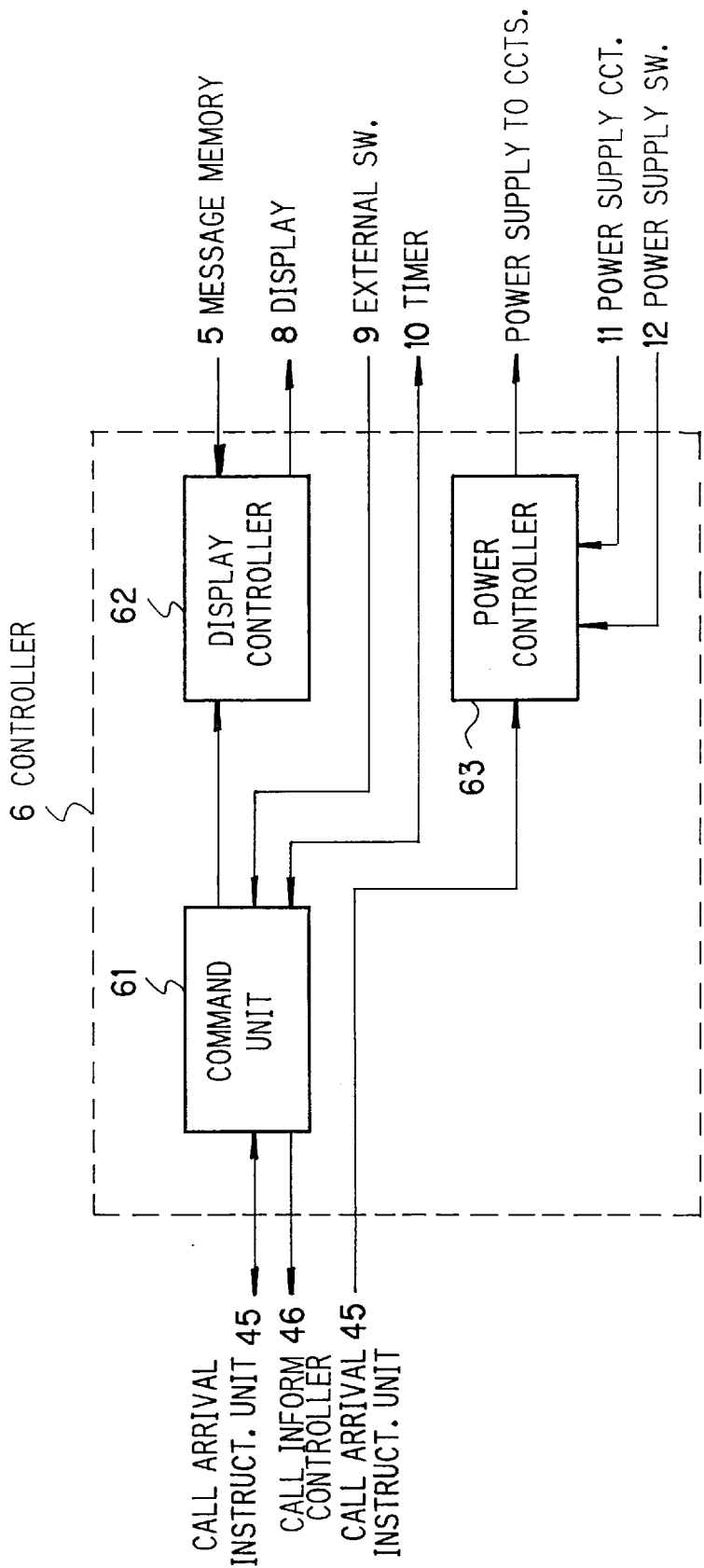
FIG. 3 shows a block diagram of the controller in FIG. 1.

The operation of the controller 6 shown in FIG. 1 will now be described in detail with reference to FIG. 3. Referring to the Figure, the controller 63 includes a command unit 61, a displaying control unit 62 and a power supply control unit 63.

The command unit 61 outputs the call informing command signal to the call informing control unit 46 in the decoder 4 and also outputs a message displaying command signal to the displaying control unit 62 in response to the message decoding end signal from the call arrival instructing unit 4 in the decoder 4. At this time, the command unit 61 sets the timer 10 to start time measurement. The command unit 61 discontinues the outputting of the call informing command signal and also the outputting of the message displaying command signal in response to the time-up signal from the timer 10. At this time, the unit 61 outputs a call informing end signal to the call arrival instructing unit 45 in the decoder 45.

The displaying control unit 62 reads out the decoded message signal from the message memory 5 in response to the message displaying command signal from the command unit 61, and the read-out decoded message signal is displayed on the display 8 while the message displaying command signal is inputted.

The power supply control unit 63 is furnished with power from the power supply circuit 11, and supplies power to receiver circuits in the "on" state of the power switch 12, while supplying no power in the "off" state of the power switch 12. The power control unit 63 sets a power supply stop inhibiting mode in response to the call number identity signal from the call arrival instructing unit 45. So long as this mode prevails, power is supplied to receiver circuits irrespective of whether the power switch 12 is turned on or off. The power control unit 63 releases the power supply stop inhibiting mode in response to a power supply stop inhibiting mode releasing signal from the call arrival instructing unit 45.

Figure 4:
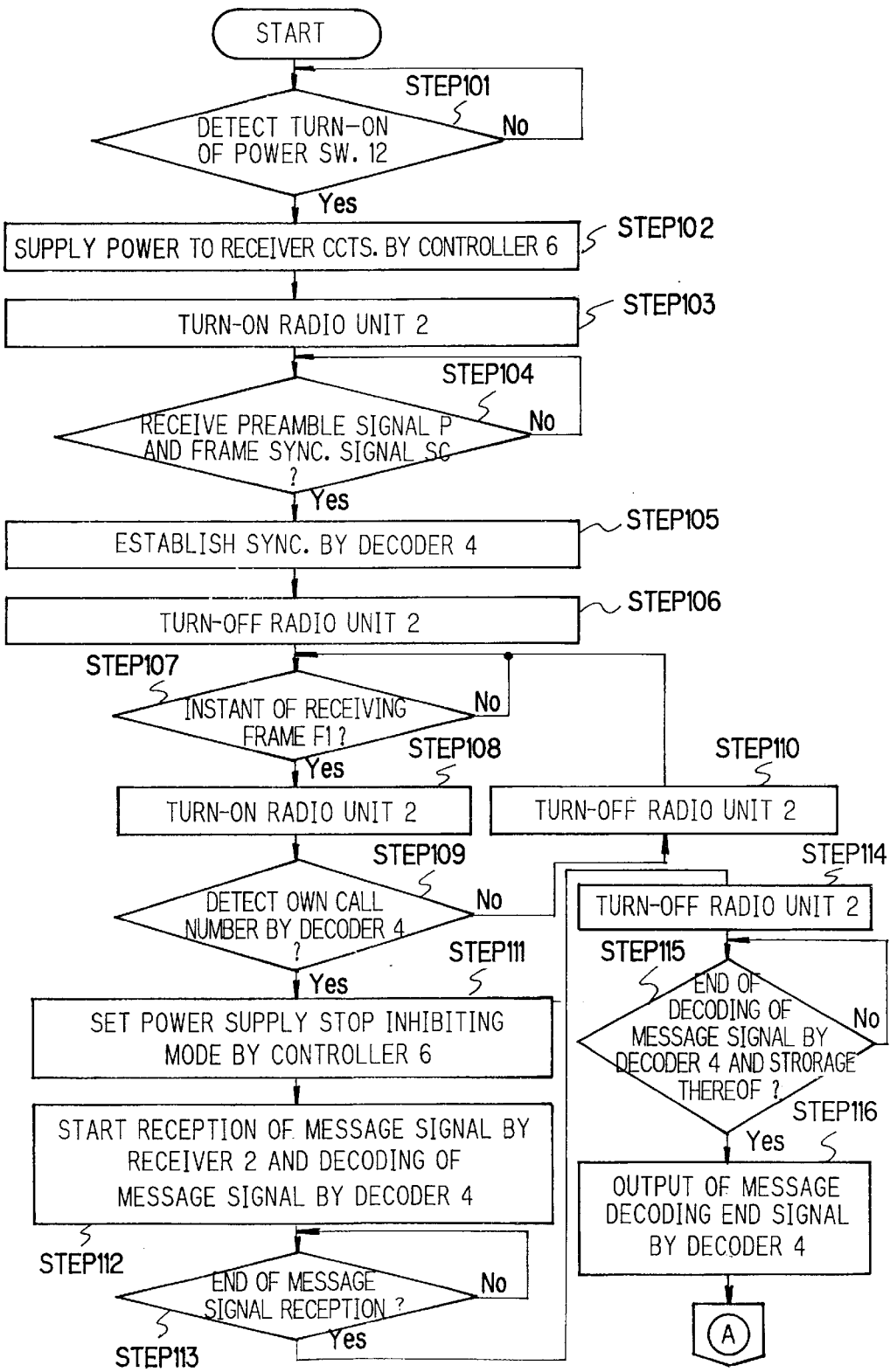
FIGS. 4 and 5 show flow charts of the power supply control in the receiver.
Figure 5:
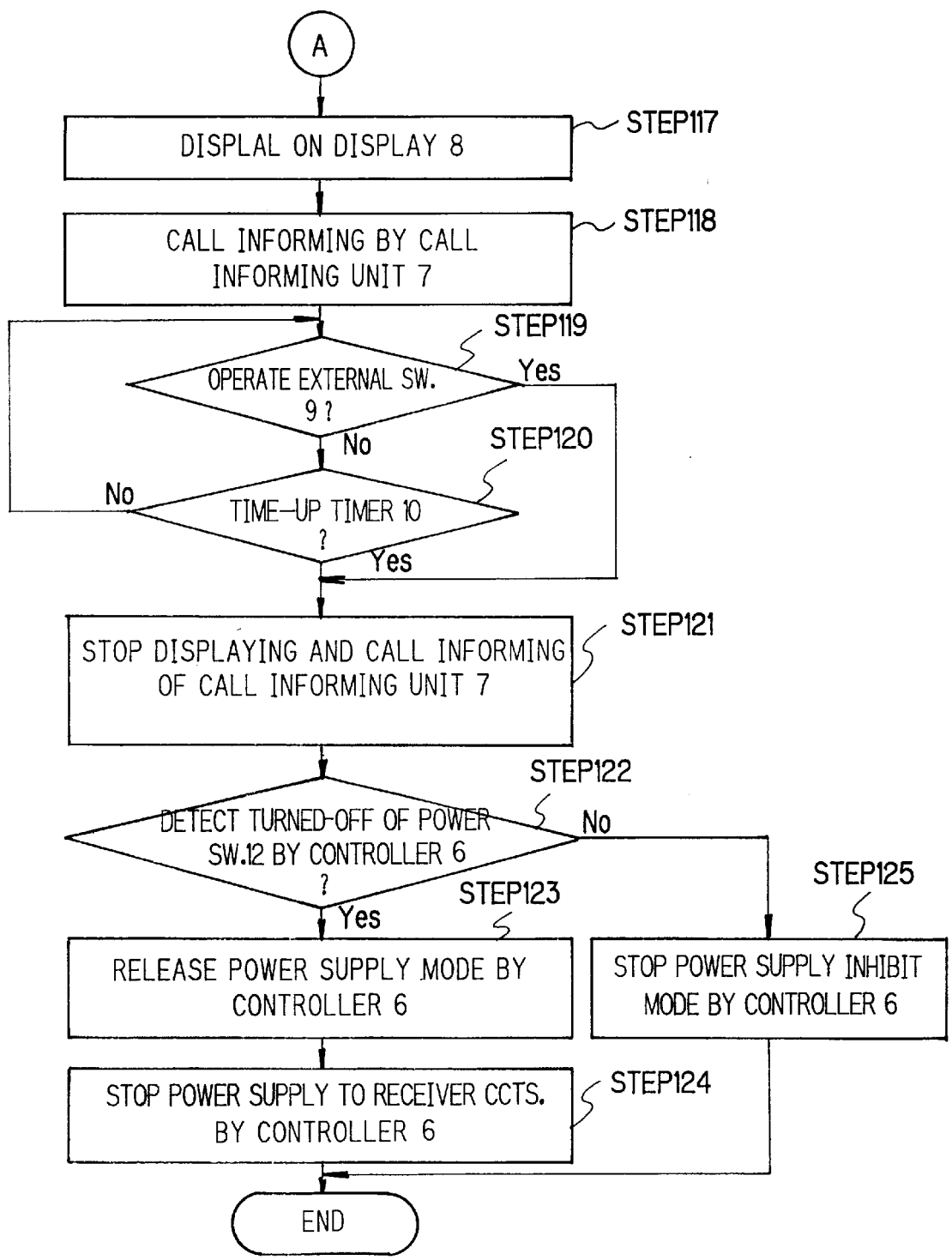

The above power supply control in the receiver will now be described with reference to the flow chart shown in FIGS. 4 and 5. Referring to the Figures, when the controller 6 detects the turning-on of the power switch 12 (STEP 101), it starts to supply the power to the receiver circuits (STEP 102). When the controller 6 starts to supply the power, the decoder 4 outputs the battery saving signal to the radio unit 2 and thus turns on the same (STEP 103).

The radio unit 2, when turned on by the decoder 4, starts to receive the received signal from the antenna 1. The radio unit 2 then receives the preamble signal P and frame synchronization signal SC, which will be described later in detail (STEP 104), and converts these signals into digital signals to be outputted to the decoder 4. The decoder 4 establishes the bit synchronization and frame synchronization of the receiver with respect to the transmission signal according to the digital signals, i.e., preamble signal P and synchronization word signal SC, from the radio unit 2 (STEP 105). After the establishment of the bit synchronization and frame synchronization, the decoder 4 outputs the battery saving signal to the radio unit 2 and thus turns off the same (STEP 106).

Upon reaching of an instant of receiving frame F1 pertaining to the receiver (STEP 107), the decoder 4 outputs the battery saving signal to the radio unit 2 and thus turns on the same (STEP 108). The radio unit 2, when turned on by the decoder 4, starts to receive the received signal from the antenna 1. Thus, the radio unit 2 receives the call number contained in the frame F1 for conversion to the digital signal to be outputted to the decoder 4. The decoder 4 compares the call number and the call number memorized in the ID memory 3 (STEP 109).

When the decoder 4 fails to detect the identity of the call numbers, it outputs the battery saving signal to the radio unit 2 and thus turns off the same (STEP 110). When the decoder 4 detects the identity of the call numbers, it outputs the call number identity signal to the controller 6. In response to this call number identity signal, the controller 6 sets a power supply stop inhibiting mode to permit continued power supply until the end of the call informing and the decoded message signal displaying irrespective of the turning-off of the power switch 12 in response to the call number identity signal (STEP 111).

The radio unit 2 then starts reception of the message signal subsequent to the call number, and the decoder 4 starts decoding of the digital signal, i.e., message signal, from the radio unit 2 (STEP 112). When the radio unit 2 ends the message signal reception (STEP 113), the decoder 4 outputs the battery saving signal to the radio unit 2 and thus turns off the same (STEP 114). When the decoder 4 ends the decoding of the message signal and storage thereof in the message memory 5 (STEP 115), it outputs the message decoding end signal to the controller 6 (STEP 116).

In response to the message decoding end signal from the decoder 4, the controller 6 reads out the decoded message signal from the message memory 5 for display on the display 8 (STEP 117). The controller 6 further outputs the call informing command signal to the decoder 4, and in response to this call informing command signal the decoder 4 outputs the call informing drive signal to the call informing unit 7. The call informing unit 7 executes call informing in response to the call informing drive signal (STEP 118).

When the external switch 9 is operated in response to the detection of the call informing by the user (STEP 119) or when the time-up of the timer 10 is brought about after the lapse of a predetermined period of time from the call informing (STEP 120), the controller 6 stops the outputting of the call informing command signal or the outputting of the decoded message. In response to this, the display 8 stops displaying, and the decoder 4 stops the outputting of the call informing drive signal, so that the call informing unit 7 stops the call informing (STEP 121).

When the controller 6 stops the outputting of the call informing command signal and the outputting of the decoded message signal, it checks whether the power switch 12 has been turned off (STEP 122). When the switch has been turned off, the controller 6 releases the power supply mode (STEP 123), thus causing the power supply to receiver circuits to be stopped (STEP 124). When the power switch 12 has not been turned off, the controller 6 releases power supply inhibit mode (STEP 125).

The power supply control as described above according to the present invention, will now be described with reference to the signal format and time chart shown in FIGS. 6(a) to 6(e).

Figure 6:
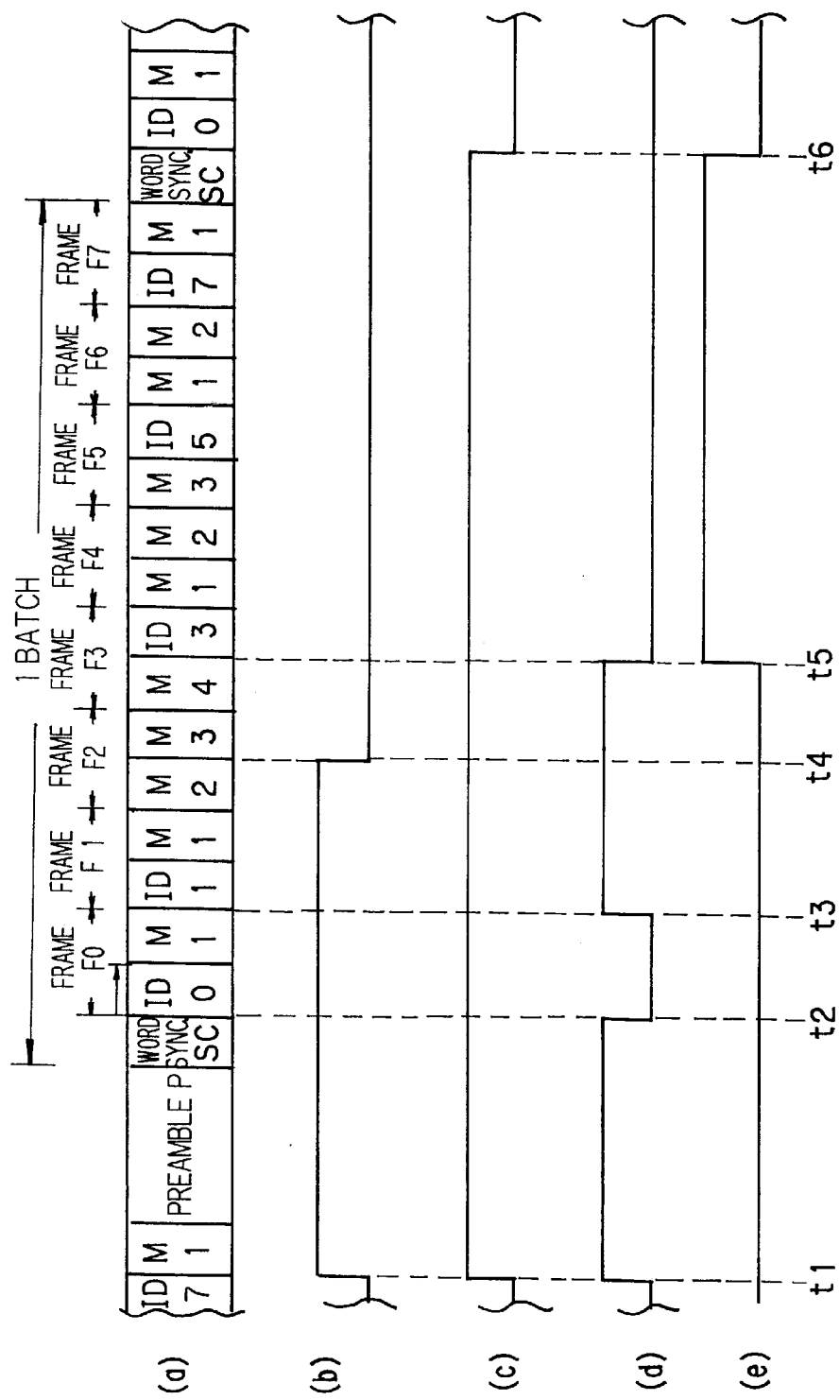
FIGS. 6(a) to 6(e) show signal format and time chart of the power supply control according to the present invention.

FIG. 6(a) shows a signal format of a POCSAG signal received by the receiver. FIG. 6(b) shows the on-off state of the power switch 12, FIG. 6(c) shows the on-off state of the power supply from the controller 6 to receiver circuits, FIG. 6(d) shows the on-off state of the radio unit 2, and FIG. 6(e) shows the on-off state of the call informing by the call informing unit 7.

The POCSAG signal shown in FIG. 6(a) will now be briefly described. The signal as shown includes a preamble signal P, a frame synchronization signal SC, and a batch of frames 0 to 7, these signals being transmitted cyclically at a predetermined time interval. One frame consists of two code words, which contain either call number or message.

In the receiver receiving the above signal according to the present invention, when the power switch 12 is turned on at instant t1 as shown in FIGS. 6(b) to 6(e), the controller 6 starts to supply power to the receiver circuits while the radio unit 2 is turned on, as shown in FIGS. 6(c) and 6(d). When the synchronization between the receiver and received signal is established at instant t2, the radio unit 2 is turned off as shown in FIG. 6(d), whereupon battery saving with respect to the radio unit 2 is started.

When the radio unit 2 is turned on at instant t3 so that the decoder 4 detects the identity with the own call number, the power supply stop inhibiting mode is set in the controller 6, whereupon the controller 6 starts decoding of message signals M1 to M4 succeeding call number ID1. When the power switch 12 is turned off at instant t4 as shown in FIG. 6(b), the controller 6 continually supplies the power to the radio unit 2 and other receiver circuits.

When the message signal reception is ended at instant t5, the radio unit 2 is turned off, and after the decoding of the received message signal the displaying of the decoded message signal and the call informing are done. When the displaying of the decoded message signal and the call informing are stopped at instant t6, the power supply from the controller 6 to the receiver circuits is stopped.

As has been described, according to the present invention the power supply to the receiver circuits is stopped after the call informing and the decoded message signal displaying. It is thus possible to permit reliable informing of the reception of the own call number to the user and also reliable informing of the message signal to the user. Besides, according to the present invention the power can be continually supplied to the receiver circuits when the power switch 12 is turned off during decoding of message signal in the decoder 4. The message signal thus can be fully decoded.

In this embodiment, the power supply to the receiver circuits is stopped after the call informing and the message displaying have been made in the receiver. However, it is possible to stop the power supply to the receiver circuits during the message displaying when the call informing has been ended.

A different embodiment of the present invention will now be described. In this embodiment, when the switch 12 is turned off while the radio unit 2 is receiving the message signal or while the decoder 4 is decoding the message signal, the power supply to the receiver circuits is stopped at the end of the message signal decoding. When the switch 12 is turned on again, call informing is done to inform the presence of a non-confirmed message to the user.

This embodiment is the same as the previous embodiment except for the internal construction of the controller 6, so the controller alone will be described in detail.

Figure 7:
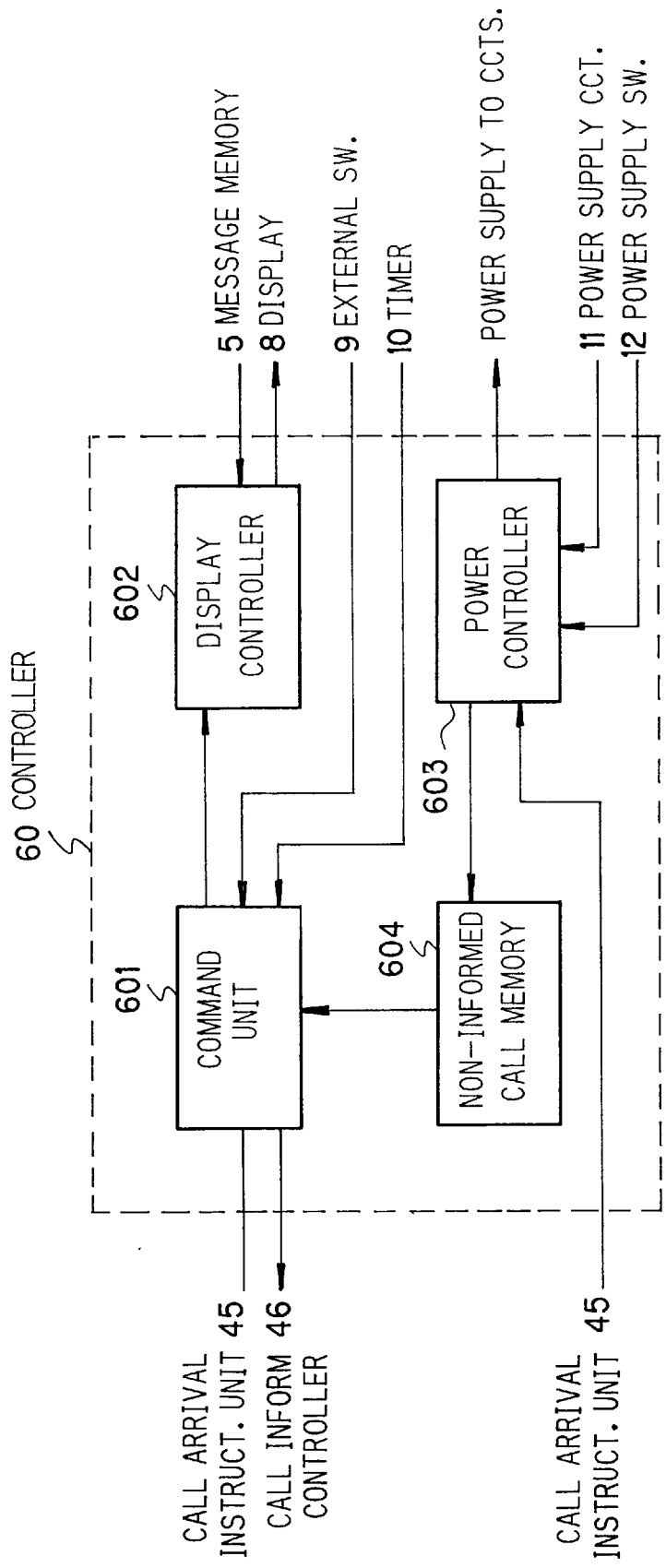
FIG. 7 shows, in block diagram, the controller 60 in the different embodiment of the present invention.

FIG. 7 shows, in block diagram, the controller 60 in the different embodiment of the present invention. Referring to the Figure, the controller 60 includes a command unit 601, a displaying control unit 602, a power supply control unit 603 and a non-informed memory 604.

The operation of the various units in the controller 6 will now be described. The command unit 601 outputs a call informing command signal to the call informing control unit 46 in the decoder 4 and also outputs a message displaying command signal to the displaying control unit 602 in response to a non-informed call informing signal from the non-informed signal memory 604. At this time, the command unit 601 sets the timer 10 to start the time measurement. The command unit 601 discontinues the outputting of the call informing command signal and the outputting of the message displaying command signal in response to a time-up signal from the timer 10.

The displaying control unit 602 reads out the decoded message signal from the message memory 5 in response to the message display command signal from the command unit 601, so that the decoded message signal is displayed on the display 8 while the message displaying command signal prevails.

While the power is supplied from the power supply circuit 11, the power supply control unit 603 supplies the power to the receiver circuits in the "on" state of the power switch 12. In the "off" state of the power switch 12, no power is supplied to the receiver circuits. The power supply control unit 603 sets a power supply stop inhibiting mode in response to a call number identity signal from the call arrival instructing unit 45. While this mode prevails, the power is supplied to the receiver circuits even when the power switch 12 is turned off. The power supply control unit 603 releases the power supply stop inhibiting mode and outputs a non-confirmed message presence signal to the non-informed call informing unit 604 in response to the message decoding end signal from the call arrival instructing unit 45. When the power switch 12 is turned on, the power supply control unit 603 outputs a non-confirmed call message retrieval signal to the non-informed call memory 604.

The non-informed call memory 604 memorizes the non-confirmed message presence signal from the power supply control unit 603. In response to the non-confirmed message retrieval signal from the power supply control unit 603, the non-informed call memory 604 outputs a non-informed call informing signal, if any, to the command unit 601. After the outputting of the non-informed call informing signal, the non-informed call memory 604 erases the memorized non-confirmed message presence signal.

Figure 8:
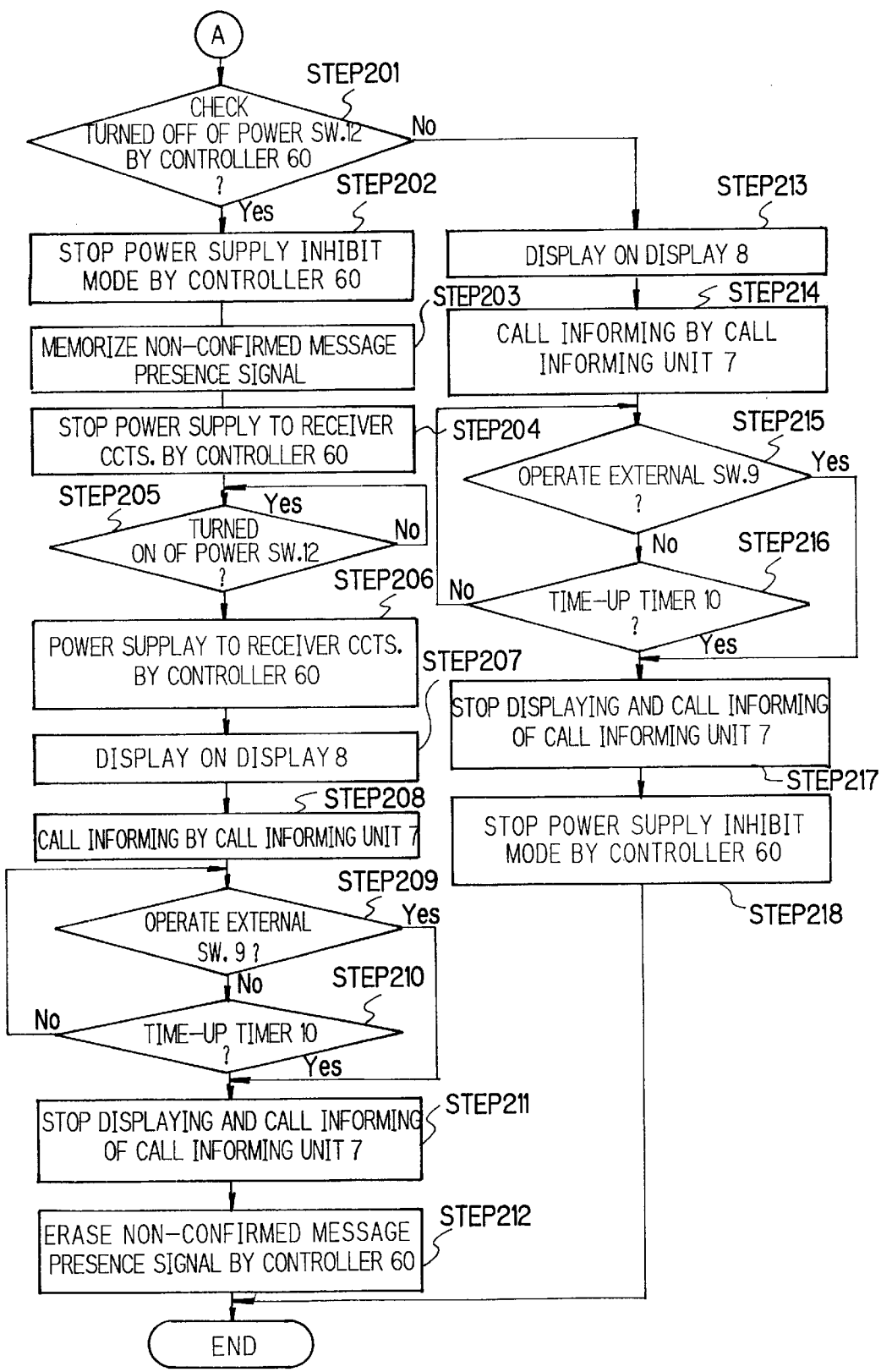
FIG. 8 shows flow chart for explaining the operation of the receiver in FIG. 7.

The operation of the receiver in this embodiment will now be described with reference to the flow chart of FIG. 8. Referring to the Figure, step A corresponds to step A in the flow chart of FIG. 4.

The controller 60 checks whether the power switch 12 has been turned off (STEP 201). When the power switch 12 has been turned off, the controller 6 releases the power supply stop inhibiting mode (STEP 202). The controller 60 memorizes the non-confirmed message presence signal and stops the power supply to the receiver circuits (STEPS 203 and 204).

Subsequently, when the power switch 12 is turned on again (STEP 205), the controller 60 starts the power supply to the receiver circuits (STEP 206). In response to the re-closing of the power switch 12, the controller 60 reads out the decoded message from the message memory 5 for displaying on the display 8 (STEP 207). The controller 60 further outputs the call informing command signal to the decoder 4. In response to the call informing command signal, the decoder 4 outputs the call informing drive signal to the call informing unit 7. In response to this call informing drive signal, the call informing unit 7 executes call informing (STEP 208).

When the user operates the external switch 9 in response to the detection of the call informing by the call informing unit 7 (STEP 209), or when the time-up of the timer 10 is brought about after the lapse of a predetermined period of time from the call informing (STEP 210), the controller 60 discontinues the outputting of the call informing command signal and also the outputting of the decoded message. In response to this, the display 8 discontinues the displaying. When the decoder 4 discontinues the outputting of the call informing drive signal, the call informing unit 7 discontinues the call informing (STEP 211). When the displaying on the display 8 and the call informing by the call informing unit 7 are discontinued, the controller 60 erases the non-confirmed message presence signal (STEP 212).

When it is detected in STEP 201 that the power switch 12 has been turned off, the controller 60 reads out the decoded message from the message memory 5 for displaying on the display (STEP 213). The controller 670 further outputs the call informing command signal to the decoder 4. In response to this call informing command signal, the decoder 4 outputs the call informing drive signal to the call informing unit 7. In response to this call informing drive signal, the call informing unit 7 executes call informing (STEP 214).

When the user operates the external switch 9 in response to the detection of the call informing by the call informing unit 7 (STEP 215), or when the time-up of the timer 10 is brought about after the lapse of a predetermined period of time (STEP 216), the controller 60 discontinues the outputting of the call informing command signal and also the outputting of the decoded message. In response to this, the display 8 discontinues the displaying. When the decoder 4 discontinues the outputting of the call informing signal, the controller 60 releases the power supply stop inhibiting mode (STEP 218).

In this embodiment, when the power switch 12 is turned off during the message signal decoding in the decoder 4, the power supply to the receiver circuits is continued, and it is stopped only after the message signal decoding. When the power switch 12 is closed again, call informing is made to inform the presence of a non-confirmed message to the user. In the previous embodiment, the user is prone to an unusual sense that call informing is done despite the fact that the power switch 12 has been turned off. In this embodiment, this does not take place.

As has been described in the foregoing, with the radio selective call receiver according to the present invention the power supply to receiver circuits is stopped after the call informing or decoded message signal displaying is over. It is thus possible to reliably inform the reception of the own call number to the user. In addition, according to the present invention, even when the power switch is turned off during the receiving or decoding of message signal, the power is supplied continually to receiver circuits to permit the decoding of the message signal. Furthermore, according to the present invention the power supply to the receiver circuits is stopped after the end of the message signal decoding, and call informing is done when the power switch is turned on again. It is thus possible to inform the presence of a non-confirmed message to the user.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A radio selective call receiver comprising:

a radio unit for receiving a radio signal from a base station and outputting a received signal;

identity detecting means for detecting a received call number contained in said received signal, determining whether said received call number matches a call number identifying said radio selective call receiver, and outputting an identification signal when said received call number matches said call number;

a power switch for controlling supply of power from a power supply to said radio selective call receiver;

call informing means for informing a user of a received call for a predetermined period of time in response to said identification signal; and control means for stopping the supply of power to said radio selective call receiver, in response to a power supply stop instruction from said power switch, delivered subsequent to output of said identification signal, only after said predetermined period of time.

2. The radio selective call receiver according to claim 1, further comprising:

decoding means for decoding a message signal following said received call number in said received signal and outputting a decoded message signal; and displaying means for displaying said decoded message signal;

said control means stopping the supply of power to said radio selective call receiver after said decoded message has been displayed.

3. The radio selective call receiver according to claim 2, further comprising:

switch means, manually operable by the user, for ending the call and terminating operation of said display means; and timer means for terminating the operation of said call informing means and said display means after a predetermined period of time from start of operation of said call informing means and said displaying means.

4. The radio selective call receiver according to claim 3, wherein said control means comprises:

a processing unit for commanding the start of operation of said call informing means, said displaying means and said timer means in response to termination of decoding said message signal;

a first power supply control unit for starting the supply of power in response to a power supply start instruction from said power switch and stopping the supply of power in response to a power supply stop instruction from said power switch;

an inhibiting mode setting unit for setting a power supply stop inhibiting mode in response to said identification signal;

a second power supply control unit for continuing the supply of power irrespective of said power supply stop instruction from said power switch when said power supply stop inhibiting mode is set; and an inhibiting mode releasing unit for releasing said power supply stop inhibiting mode in response to termination of operation of said call informing means and said displaying means.

5. The radio selective call receiver according to claim 1, further comprising:

memory means for storing said decoded message signal.

6. The radio selective call receiver according to claim 1, wherein said decoder comprises:

a synchronization establishing unit which establishes bit synchronization and frame synchronization of said radio selective call receiver with respect to a transmission signal on the basis of a preamble signal and a frame synchronization signal contained in said received signal, and outputs a synchronization establishment signal;

an ID detecting unit which receives said received signal from said radio unit while receiving said call number pertaining to said radio selective call receiver in response to said synchronization establishment signal, compares said received call number and said call number stored in said ID memory, and outputs said identification signal when said received call number is the same as said call number;

a message processing unit which receives said received signal from said radio unit while receiving a message signal succeeding said received call number in response to said identification signal from said ID detecting unit, decodes said message signal, and outputs a decoded message signal to a message memory, and outputs a message recording end signal after said message signal has been decoded;

a radio control unit which outputs a batter saving signal to said radio unit in response to the start of power supply from said controller, outputs said battery saving signal to said radio unit and thus turns off said radio unit in response to said synchronization establishment signal from said synchronization establishing unit, outputs said battery saving signal to said radio unit thus turns on said radio unit during a time of receiving a frame pertaining to said radio selective call receiver, outputs said battery saving signal to said radio unit and thus turns off said radio unit when said radio unit has not received said identification signal from said ID detecting unit after lapse of a predetermined period of time from the turning-on of said radio unit, and continually maintains said radio unit on when said radio unit receives said identification signal from said ID identity unit;

a call arrival instructing unit which outputs said message decoding end signal from said message processing unit to said control unit, when it receives the call informing end signal from the controller, outputs a power supply stop inhibiting mode releasing signal to the controller, and outputs a call informing drive signal to the call informing unit in response to a call informing command signal from the controller.

7. The radio selective call receiver according to claim 6, wherein said controller comprises:

a command unit which outputs said call informing command signal to said call informing control unit and also outputs a message displaying command signal in response to said message decoding end signal, sets said timer to start the time measurement, discontinues output of said call informing command signal and also output of said message displaying command signal in response to said time-up signal from said timer, and outputs said call informing end signal to said call arrival instructing unit in said decoder;

a displaying control unit which reads out said decoded message signal from said message memory in response to said message displaying command signal, and said decoded message signal is displayed on said display while said message displaying command signal is input; and a power supply control unit which supplies power to said radio selective call receiver in the "on" state of said power switch, sets a power supply stop inhibiting mode in response to said identification signal from said call arrival unit, the power being supplied to said radio selective call receiver irrespective of whether said power switch is turned on or off, and releases said power supply stop inhibiting mode in response to a power supply stop inhibiting mode releasing signal from said call arrival instructing unit.

8. A radio selective call receiver comprising:

a radio unit for receiving a radio signal from a base station and outputting a received signal;

identity detecting means for detecting a received call number contained in said received signal, determining whether said received call number matches a call number identifying said radio selective call receiver, and outputting an identification signal when said received call number matches said call number;

decoding means for decoding a message signal succeeding said received call number and outputting a decoded message signal;

call informing means for informing a user of a received call in response to said identification signal;

memory means for storing said decoded message signal;

displaying means for displaying said decoded message signal;

a power switch for controlling supply of power from a power supply to said radio selective call receiver;

control means for stopping the supply of power to said radio selective call receiver in response to a power supply stop instruction from said power switch, delivered subsequent to output of said identification signal; and call informing executing means for initiating operation of said call informing means in response to a power supply instruction from said power switch when said memory means is storing a non-displayed decoded message signal.

9. The radio selective call receiver according to claim 8, further comprising:

means for supplying a non-displayed decoded message signal to said displaying means to be displayed in response to said power supply instruction from said power switch when said memory means is storing said non-displayed decoded message signal.

10. A radio selective call receiver comprising:

an antenna which receives a radio signal from a base station;

a radio unit which amplifies, demodulates and waveform shapes a received signal, and is on-off controlled according to a battery saving signal;

an ID memory which stores a predetermined call number;

a decoder which, after power is turned "on", establishes bit synchronization and frame synchronization of said radio selective call receiver with respect to said received signal by detecting a synchronizing signal in said received signal, outputs said battery saving signal to said radio unit on the basis of said synchronizing signal, compares a call number contained in said received signal and said predetermined call number stored in said ID memory, outputs a call number identity signal when said call number is the same as said predetermined call number, decodes a message signal succeeding said call number, outputs a decoded message signal, outputs a decoding end signal, and outputs a call informing drive signal in response to a call informing command signal;

a message memory which stores said decoded message signal from said decoder and outputs a stored message;

a power supply circuit;

a power switch which is on-off operable by a user to initiate and terminate the supply of power from said power supply circuit to said radio selective call receiver;

a controller which receives said call number identity signal from said decoder while power is "on", controls the supply of power from said power supply circuit irrespective of subsequent turning-off of said power switch, in response to said decoding end signal, reads said decoded message signal to be read out of said message memory for displaying on a display, while also outputting said call informing command signal to said decoder and starting a timing operation, continues the supply of power in an "on" state of said power switch at a moment discontinuing said display and output of said call informing command signal, and terminating supply of power in an "off" state of said power switch at this moment;

a call informing unit which executes call informing in response to said call informing command signal from said decoder;

an external switch which is operable by the user and, when it is depressed curing call informing by said call informing unit, outputs a power supply stop signal to said controller; and a timer which starts said timing operation when said call informing unit starts call informing, and upon lapse of a predetermined period of time, outputs a time-up signal to said controller.

11. The radio selective call receiver according to claim 10, wherein said call informing unit includes at least one of a loudspeaker, an LED and a vibrator.

* * * * *

UNITED STATES PATENT AND TRADEMARK OFFICE
CERTIFICATE OF CORRECTION

PATENT NO. : 5,832,366
DATED : November 3, 1998
INVENTOR(S) : Shinjiro UMETSU

It is certified that error appears in the above-identified patent and that said Letters Patent is hereby corrected as shown below:

On the title page, item [57]:

Abstract, line 3, delete "be made call informing when the own call number is received. The message signal decoding can always be made" and insert --inform a user of a call when a call is received.--.

Column 12, line 50, delete "curing" and insert --during--.

Signed and Sealed this

Fifteenth Day of June, 1999

Attest:

Q. TODD DICKINSON

*Attesting Officer*  *Acting Commissioner of Patents and Trademarks*